United States Patent
Home

(10) Patent No.: US 6,932,101 B2
(45) Date of Patent: Aug. 23, 2005

(54) SOLENOID VALVE ASSEMBLY FOR CONTROLLING GAS SUPPLY

(75) Inventor: William Home, Taipei (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/171,660

(22) Filed: Jun. 17, 2002

(65) Prior Publication Data

US 2003/0230339 A1 Dec. 18, 2003

(51) Int. Cl.⁷ ............................ F23D 5/16; F16K 11/24
(52) U.S. Cl. ................. 137/66; 137/489.5; 431/43; 431/60
(58) Field of Search .................. 137/65, 66, 489, 137/489.5, 492, 492.5; 431/42, 43, 46, 50, 56, 58, 60, 61

(56) References Cited

U.S. PATENT DOCUMENTS

| | | | | |
|---|---|---|---|---|
| 2,615,511 A | * | 10/1952 | Ray | 431/58 |
| 3,191,661 A | * | 6/1965 | Ray | 137/66 |
| 4,060,370 A | * | 11/1977 | Fleer | 137/489.5 |
| 4,080,154 A | * | 3/1978 | Kinsella | 431/43 |
| 4,111,640 A | * | 9/1978 | Scott | 431/46 |
| 4,610,269 A | * | 9/1986 | Kelly | 137/489.5 |
| 4,830,039 A | * | 5/1989 | Kelly et al. | 137/66 |
| 5,044,390 A | * | 9/1991 | Kelly et al. | 137/66 |
| 6,263,908 B1 | * | 7/2001 | Love et al. | 137/489 |
| 6,536,459 B2 | * | 3/2003 | Huang | 137/66 |

* cited by examiner

Primary Examiner—Kevin Lee
(74) Attorney, Agent, or Firm—Leong C. Lei

(57) ABSTRACT

A solenoid valve assembly for controlling gas supply and opening and closing gas supply with a regulation function generally includes a solenoid valve assembly having a housing, a diaphragm assembly, a first and second solenoid valves, a first and second valve bodies, a first and second terminals of positive and negative poles, a first and second wire winding assemblies, a first and second "E" type cores, a first and second "T" type cores, springs, and brackets of the first and second valves, wherein a small power is required for the opening and closing of diaphragms because of the adopted indirect opening capability of this valve.

6 Claims, 5 Drawing Sheets

FIG. 3 -Stand-by condition of controling gas supply
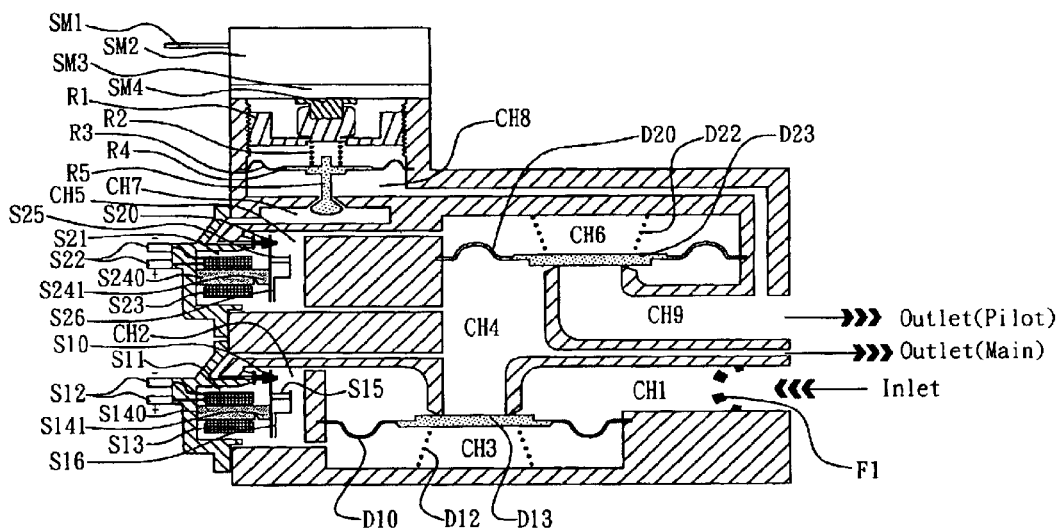
FIG. 4 -First Step[S1 opened]
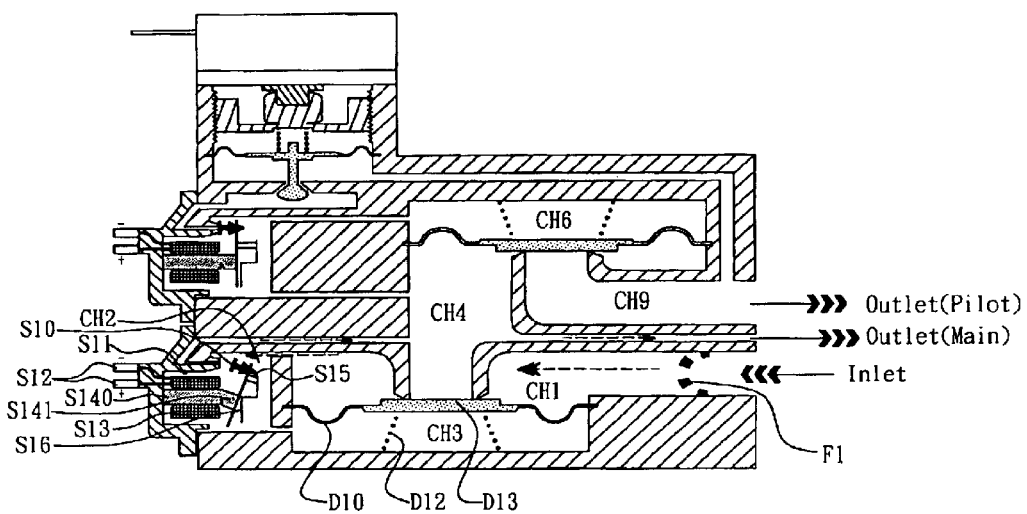

FIG. 5 -Second Step[D1 opened]
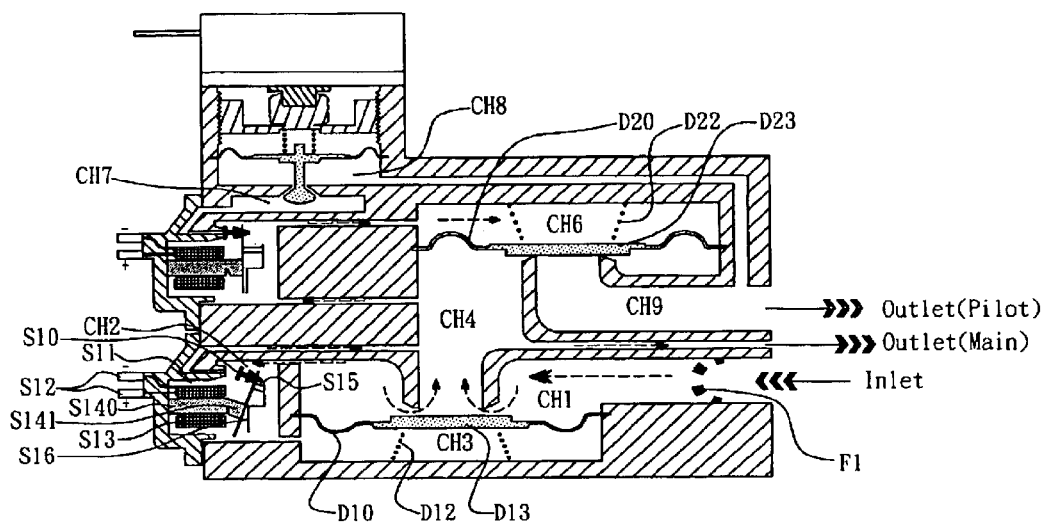
FIG. 6 -Third Step[S2 opened]
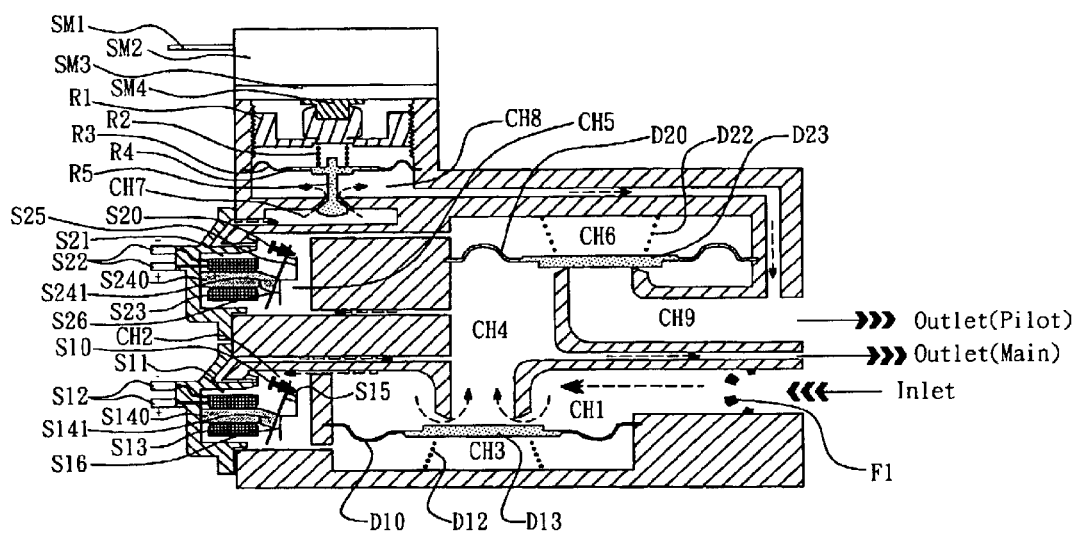

FIG. 7 -Fourth Step[D2 opened]
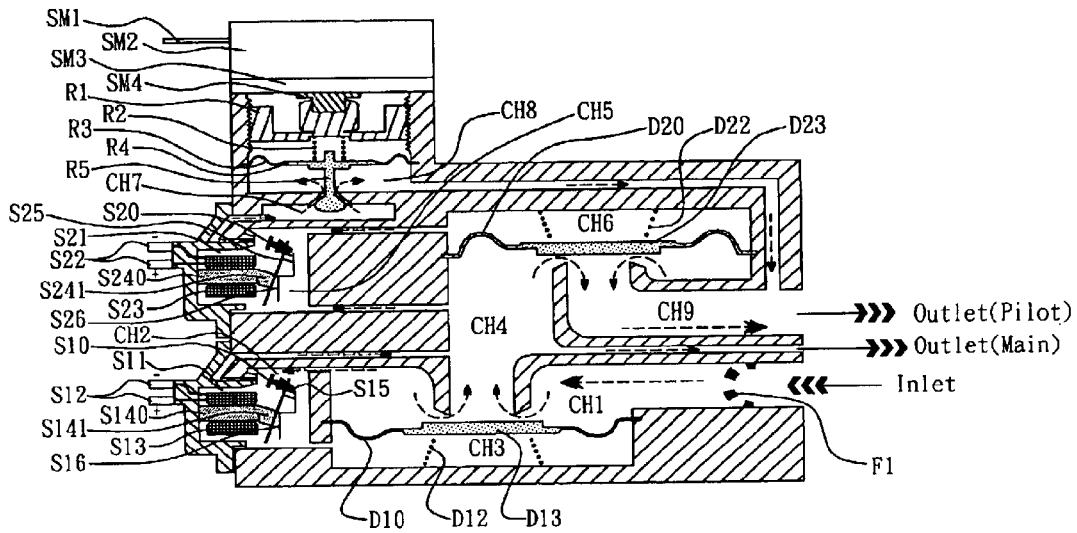
FIG. 8 -Fifth Step[Max gas flowing]
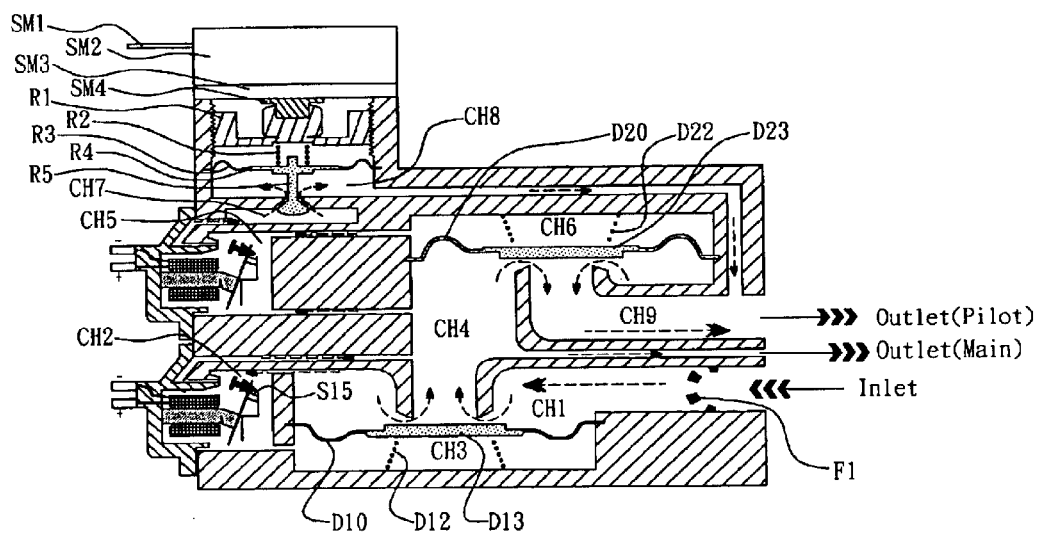

FIG. 9 –Final Step of the opening/closing gas supply
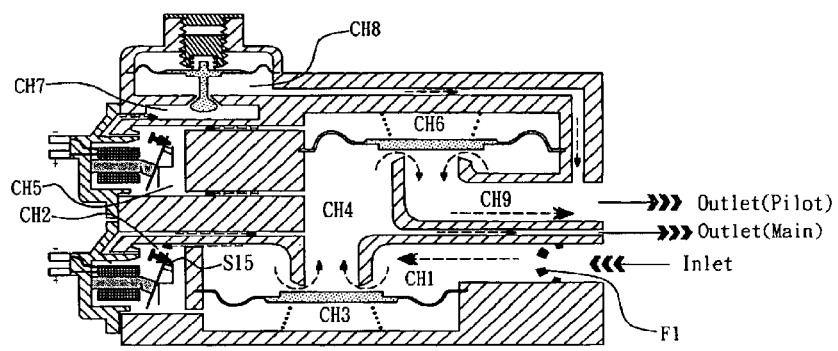

SOLENOID VALVE ASSEMBLY FOR CONTROLLING GAS SUPPLY

BACKGROUND OF THE INVENTION

1. Field of the Invention

This invention is related to a method of controlling gas supply and opening and closing gas supply with a regulation function, and relates in particular to the small power consumption required for the opening and closing of a diaphragm because of the adopted indirect opening capability of this method.

2. Description of the Prior Art

Generally, there are two kinds of conventional gas heaters. One kind of conventional gas heater is operated by hand mechanically, and a gas burner is ignited by pressing or turning and holding a knob until the thermocouple or thermopile in the gas burner generates enough steady current to hold the plunger and keep the valve in open status. This operation for igniting the gas burner always requires the user to hold the knob for a certain period of time, which is inconvenient for the user. The other kind of conventional gas heater is operated by an electronic function. After pressing the "ON" button, the gas valve, igniter and sensor for recognizing the flame are operated automatically by a microprocessor or some logical circuit connections. But this kind of device, like the gas valve, consumes more power and requires AC power such as AC 110V or AC 240V, thereby creating higher costs and extra payments for installation, and requiring more parts to be designed for the products and to maintain them.

Therefore, it is an object of the present invention to provide a method for controlling the gas supply to a gas burner, which can obviate and mitigate the above-mentioned drawbacks.

SUMMARY OF THE INVENTION

This invention is related to a method for controlling gas supply and opening and closing gas supply with a regulation function, and relates in particular to the small power consumption required for the opening and closing of a diaphragm because of the adopted indirect opening capability of this method.

It is the primary object of the present invention to provide a method for controlling gas supply and the opening and closing of the main burner with a regulation function which operates with ultra-low power consumption by using a small capacity battery for a long time while still maintaining and automatically operating all functions, and to easily install the products required for this function and to reduce the cost of designing said products.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3 shows the stand-by condition to understand the working principle of the method for controlling gas supply and the opening and closing of the gas supply.

FIG. 4 shows the first step of the working principle of the method for controlling gas supply when the first solenoid valve is opened.

FIG. 5 shows the second step of working principle of the method for controlling gas supply when the first diaphragm is opened.

FIG. 6 shows the third step of the working principle of the method for controlling gas supply when the second solenoid valve is opened.

FIG. 7 shows the fourth step of the working principle of the method for controlling gas supply when the second diaphragm is opened.

FIG. 8 shows the fifth step of the working principle of the method for controlling gas supply when the stem with regulation diaphragm is opened by the servo motor assembly.

FIG. 9 shows the final step of the working principle of the method for opening and closing gas supply when the first solenoid and diaphragm is opened, the second solenoid and diaphragm is opened and the regulation diaphragm is opened by the servo motor assembly.

DETAILED DESCRIPTION OF THE PREFERRED EMBODIMENT

Figure 1:
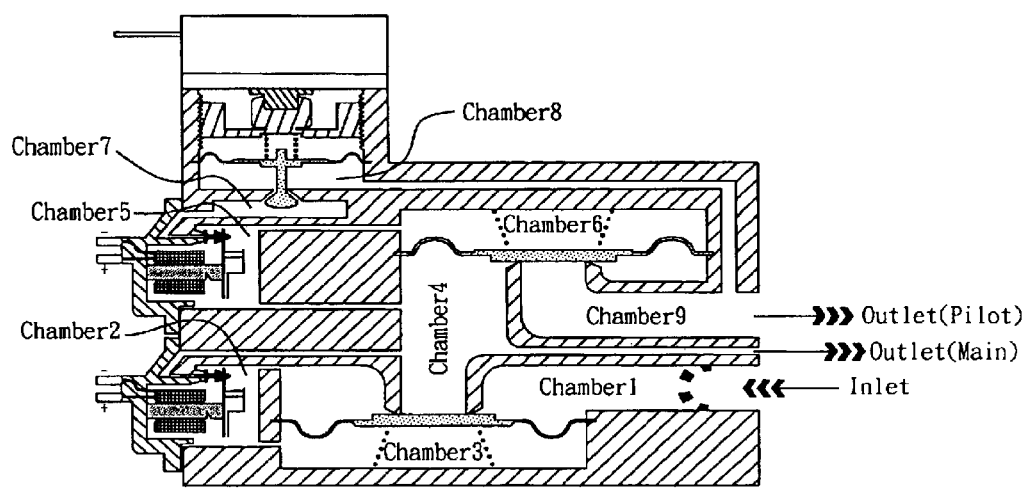
FIG. 1 and FIG. 2 show perspective views to understand the structure and important parts for controlling gas supply according to the present invention.

For the purpose of promoting an understanding of the principles of this invention, reference will now be made to the embodiment illustrated in the drawings. Specific language will be used to describe same. It will nevertheless, be understood that no limitation of the scope of the invention is thereby intended. Such alterations and further modifications in the illustrated device, and such further applications of the principles of the invention as illustrated herein being contemplated as would normally occur to one skilled in the art to which the invention relates.

FIG. 1 shows the method for controlling gas supply by a servo motor, reduction gear box and gear with regulation function.

Figure 2:
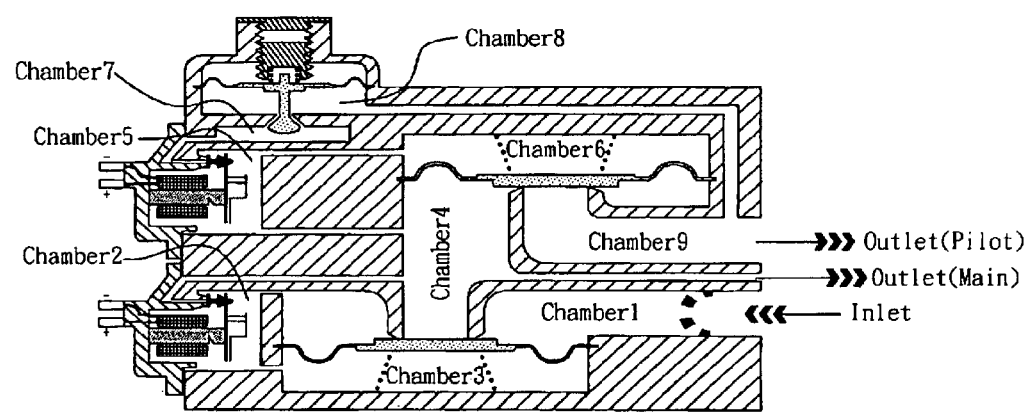

FIG. 2 shows the method for opening and closing gas supply with a regulation function.

FIG. 3 shows the stand-by condition to understand the working principle of this method for controlling gas supply and opening and closing the gas supply.

The solenoid valve assembly consists of valves S10 and S20, solenoid valve bodies S11 and S21, terminals of positive and negative poles S12 and S22, wire winding assemblies S13 and S23, "E" type cores S140 and S240, "I" type cores S141 and S241, springs S15 and S25, and brackets S16 and S26 of the valves. The solenoid valve assembly is positioned in chamber CH2 and the chamber CH5. The solenoid valve assembly normally closes in stand-by condition and seals up between chamber CH2 and chamber CH4 or chamber CH5 and chamber CH7.

The diaphragm assembly comprises diaphragms D10 and D20, springs D11 and D21 and diaphragm plates D13 or D23. The diaphragm assembly is combined into the chamber CH3 or chamber CH6. At stand-by condition, those diaphragms seal up to avoid the gas flowing from chamber CH1 to chamber CH4 or from chamber CH4 to chamber CH9 (the outlet), because the pressure is equalized between chamber CH1 and chamber CH3 or chamber CH4 and chamber CH6. Additionally, the force of the springs D12 and D22 pushes the diaphragms D13 and D23 to close.

> Force of spring $D12$+pressure in chamber $CH3$>pressure in chamber $CH1$

> Force of spring $D22$+pressure in chamber $CH6$>pressure in chamber $CH4$

The regulation assembly comprises of an adjust rotator R1, a spring R2, a diaphragm R3, a plate of a diaphragm R4, and a stem R5. At stand-by condition, the stem R5 seals up between chamber CH7 and chamber CH8 to avoid gas flowing between the two chambers. At the same time, the adjust rotator R1 is located at its highest position by the servo motor assembly.

The servo motor assembly consists of wire SM1, a servo motor SM2, speed reduction gear SM3, and a rotator SM4.

FIG. 4 shows the first step of the working principle of the concept for controlling gas supply when the first solenoid valve is opened. When the voltage is supplied to solenoid terminals S12, "E" type core S140 and "I" type core S141 each produce a magnetic field which come into contact with each other. When this occurs, the solenoid valve S1 will open. At this moment, the gas flows through chamber CH1, chamber CH2, chamber CH4 and the outlet of the pilot injector.

FIG. 5 shows the second step of the working principle of the method for controlling gas supply when the first diaphragm D10 is opened.

In the FIG. 4 condition, the pressure in the chamber CH3 will be lowering, because the gas flowing through chamber CH1 and chamber CH4 have the effect of suctioning or reducing the pressure in chamber CH3. Additionally, the total diameter of chamber CH1 is smaller then the total diameter of chamber CH2 and chamber CH3. The effect of this smaller diameter of chamber 1 is that it helps to gain more suction pressure in chamber CH3, and therefore the diaphragm will no longer be balanced, and will open. Thus, > Force of spring $D12$+pressure in chamber $CH3$–suction pressure in chamber $CH3$<pressure in chamber $CH1$ At this moment, the pressure is equalized between chamber CH4 and chamber CH6. Additionally, the force of the spring D22 pushes the diaphragm D23 to close.

FIG. 6 shows the third step of the working principle of the method for controlling gas supply when the second solenoid valve is opened. When the voltage is supplied to the solenoid terminal S22, "E" type core S240 and "I" type core S241 each produce a magnetic field which come into contact with each other. When this occurs, the solenoid valve S2 will open. At this moment, the gas flows through chamber CH4, chamber CH5, chamber CH7, chamber CH8 and the outlet of the main burner.

FIG. 7 shows the fourth step of the working principle of the method for controlling gas supply when the second diaphragm is opened. In the FIG. 6 condition, the pressure in the chamber CH6 will be lowering, because gas flowing through chamber CH4 and chamber CH5 have the effect of suctioning or reducing the pressure in chamber CH6. Additionally, the total diameter of chamber CH4 is smaller than the total diameter of chamber CH5 and chamber CH6, thereby gaining more suction pressure in chamber CH6. Therefore, the diaphragm will no longer be balanced, and will open. Thus, > Force of spring $D22$+pressure in chamber $CH6$–suction pressure in chamber $CH6$<pressure in chamber $CH4$ FIG. 8 is shown the fifth step of the working principle of the method for controlling gas supply when the stem R5 with regulation diaphragm R3 is opened more than FIG. 7 by the servo motor assembly.

When the stem R5 is forced down by the servo motor assembly, the suction pressure in chamber CH6 will be increased, and therefore the diaphragm will open further and the volume of gas flowing will also be increased. The volume of gas flowing will controlled by the space of chamber CH7 by the stem F6 and the servo motor assembly. The process is as follows:

Control of the stem position (up/down)
suction pressure in chamber CH6 (decrease/increase)
position of diaphragm D20 (more closing/more opening)
volume of gas flowing (less/more)

FIG. 9 shows the final step of the working principle of the method for opening and closing gas supply. When the first solenoid S10 and diaphragm D10 are opened, the second solenoid S20 and the diaphragm D20 are opened and the regulation diaphragm R3 is kept open by adjusting the regulation.

The difference between the method of controlling the gas supply and opening and closing the gas supply is in the using an adjustor of regulation instead of the servo motor assembly to fix the regulation level. Also, the outlet pressure of the gas main can be changed by the position of the regulation adjustor.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A gas supply control system comprising:
   a housing formed to define at least first, second, third, fourth, fifth, sixth, seventh, eighth, and ninth chambers, said first chamber communicating with a gas inlet, said fourth and ninth chambers respectively communicating with a pair of gas outlets;
   a solenoid valve assembly coupled said housing, said valve assembly including a first solenoid valve disposed in said second chamber for selectively controlling communication thereof with said fourth chamber, and a second solenoid valve disposed in said fifth chamber for selectively controlling communication thereof with said seventh chamber; and,
   a diaphragm assembly coupled to said housing, said diaphragm assembly including a first diaphragm disposed across said third chamber selectively engaging a partition between said first and fourth chambers for controlling communication therebetween, and a second diaphragm disposed across said sixth chamber selectively engaging a partition between said fourth and ninth chambers for controlling communication therebetween;
   said first diaphragm being deflectable responsive to said first solenoid valve opening communication between said second and fourth chambers;

said second diaphragm being deflectable responsive to said second solenoid valve opening communication between said fifth and seventh chambers;

whereby when a predetermined voltage is applied to said first solenoid valve, said first solenoid valve will be open thereby enabling gas to flow through said first, second, and fourth chambers and said gas outlets.

2. The gas supply control system as recited in claim 1 further comprising a servo motor actuated regulation assembly coupled to said housing, said regulation assembly including an adjust rotator having a stem extending therefrom for selectively blocking communication between said seventh and eighth chambers, whereby when said stem is forced down by said servo motor actuated regulation assembly, gas will flow through said seventh and eight chambers to said ninth chamber thereby increasing volume of gas flowing.

3. The gas supply control system as recited in claim 1 wherein said first and second diaphragms are resiliently biased to respective closed positions, said first diaphragm being deflectable to open communication between said first and fourth chambers responsive to said first solenoid valve opening communication between said second and fourth chambers, said second diaphragm being deflectable to open communication between said fourth and ninth chambers responsive to said second solenoid valve opening communication between said fifth and seventh chambers.

4. The gas supply control system as recited in claim 3 wherein said second and third chambers are disposed in open communication one with the other, and said fifth and sixth chambers are disposed in open communication one with the other.

5. The gas supply control system as recited in claim 1 wherein each of said first and second solenoid valves include a valve body, positive and negative pole terminals coupled to said valve body, and "E" type core and a "T" type core coupled to said valve body, and a wire winding assembly disposed thereabout.

6. The gas supply control system as recited in claim 1 wherein each or said first and second diaphragms includes a diaphragm plate and a biasing spring coupled thereto.

* * * * *